United States Patent [19]
Uehara et al.

[11] Patent Number: 4,872,076
[45] Date of Patent: Oct. 3, 1989

[54] RECORDING AND/OR REPRODUCING APPARATUS

[75] Inventors: Tsukasa Uehara, Tokyo; Masaya Maeda; Akimasa Nishimura, both of Kanagawa, all of Japan

[73] Assignee: Canon Kabushiki Kaisha, Tokyo, Japan

[21] Appl. No.: 309,947

[22] Filed: Feb. 9, 1989

Related U.S. Application Data

[63] Continuation of Ser. No. 183,480, Apr. 15, 1988, abandoned, which is a continuation of Ser. No. 777,282, Sep. 18, 1985, abandoned.

[30] Foreign Application Priority Data

Sep. 19, 1984 [JP] Japan .................................. 59-196356

[51] Int. Cl.$^4$ ............................................. G11B 5/012
[52] U.S. Cl. ................................. 360/99.07; 360/96.5
[58] Field of Search ............... 360/99.07, 99.06, 98.04, 360/98.06, 96.1–96.6, 93, 85, 95; 242/196–201; 369/191–196, 201–204

[56] References Cited

U.S. PATENT DOCUMENTS 4,319,292  3/1982  Katoh ................................. 360/96.5
4,587,585  5/1986  Shimaoka ............................ 360/97

Primary Examiner—A. J. Heinz
Attorney, Agent, or Firm—Toren, McGeady & Associates

[57] ABSTRACT

A recording and/or reproducing apparatus having a cassette loading device. The loading device includes a first holding member for holding a cassette and a second holding member which is located behind the first holding member relative to a cassette inserting direction and is arranged separately from the first holding member to hold the cassette in conjunction with the first holding member. The arrangement facilitates assembly and adjustment work on the loading device and particularly on cassette holding devices.

34 Claims, 5 Drawing Sheets

RECORDING AND/OR REPRODUCING APPARATUS

CROSS REFERENCE

This is a continuation application of Ser. No. 183,480, filed Apr. 15, 1988, which is a continuation of Ser. No. 777,282 filed Sept. 18, 1985, both abandoned.

That which is disclosed but not claimed is claimed herein in two copending patent applications of the same assignee, Ser. Nos. 777,229 and 777,235 both entitled "Recording and/or Reproducing Apparatus" and filed on the same date, Sept. 18, 1985, as the present application.

BACKGROUND OF THE INVENTION

1. Field of the Invention

This invention relates to a recording and/or reproducing apparatus, and more particularly, to a record bearing medium container loading device in a recording and/or reproducing apparatus of the front loading type.

2. Description of the Prior Art

Among recording and/or reproducing apparatuses of the kind which record information on a disc-shaped record bearing medium, such as a flexible magnetic disc, while concentrically or helically forming a recording track or tracks, and/or reproducing the information thus recorded, some of them are arranged to have a record bearing medium container, which is called a cassette, a jacket or a package (hereinafter called the cassette), inserted from the front side of the apparatus. This loading arrangement is called a front loading method.

In accordance with the front loading method, the cassette is generally inserted by hand into a cassette holding part (hereinafter referred to as a cassette holder) from the front side of the apparatus. A loading switch operates to actuate a loading motor when the cassette reaches a predetermined position of insertion. Then, the cassette holder, which is thus holding the cassette, first moves in the direction of insertion and, following that movement, comes to almost perpendicularly descend to a predetermined position. At the predetermined position, the record bearing medium which is contained in the cassette is mounted on a drive member, such as a spindle, which is connected to a record bearing medium driving motor. In taking out the cassette, the loading motor reversely rotates. This causes the cassette holder first to vertically ascend and then to horizontally move in a direction reverse to the insertion direction to a point at which it can be manually taken out.

In the conventional apparatus of this kind, the cassette holder and a cassette holder moving device have necessitated a complex structural arrangement. Hence, much time has been required in assembling and adjusting the cassette holder. The complexity of the structural arrangement of the cassette holder and parts in association therewith further increases in cases where the apparatus is provided with a pressing device for pressing or pushing the record bearing medium onto a rotatory spindle and/or with a stabilizer plate or the like for the purpose of stabilizing the medium relative to a recording and/or reproducing head.

SUMMARY OF THE INVENTION

It is an object of the present invention to provide a recording and/or reproducing apparatus incorporating therein a novel device for loading the apparatus with a record bearing medium container which is capable of solving the above-stated problems of the prior art arrangement.

It is another object of this invention to provide means for facilitating assembly and adjustment work on a holding part which is arranged to hold a record bearing medium container in a recording and/or reproducing apparatus.

Under this object, according to an aspect of this invention, a loading device for a recording and/or reproducing apparatus comprises: a first holding member arranged to hold a record bearing medium container; and a second holding member which is disposed behind the first holding member relative to the incoming direction of the container and is arranged separately from the first holding member to hold the container in conjunction with the first holding member.

It is a further object of this invention to provide means which is arranged, in addition to attaining the above-stated objects, to ensure that a record bearing medium container is safely and reliably loaded and taken out.

Under this object, according to another aspect of this invention, a loading device for a recording and/or reproducing apparatus comprises: a first holding member arranged to hold a record bearing medium container; a second holding member which is disposed behind the first holding member relative to the incoming direction of the container and is arranged separately from the first member to hold the container in conjunction with the first holding member; and moving means arranged to move the second holding member in a first direction and also in a second direction which differs from the first direction and to move the first holding member solely in the second direction.

It is a still further object of this invention to provide means which is arranged, in addition to attaining the above-stated objects, to permit simplification of a shutter opening and closing device provided on a record bearing medium container.

Under this object, according to a further aspect of this invention, a loading device for a recording and/or reproducing apparatus comprises: a first holding member arranged to hold a record bearing medium container; a second holding member which is disposed behind the first holding member relative to the incoming or inserting direction of the container and is arranged separately from the first member to hold the container in conjunction with the first holding member; moving means arranged to move the second holding member in first and second different directions and to move the first holding member solely in the second direction; and shutter, moving means for causing a shutter which is arranged to open and close window parts provided in the record bearing medium container, to move in the above-stated first direction.

The embodiment of this invention given above is arranged to have the second holding member provided with means for pulling the container further inward in the container inserting direction. Meanwhile, the shutter moving means can be provided on the first holding member. In case that the record bearing medium contained within the container is a flexible disc, the embodiment may be provided with pressing means for pressing the disc against a rotatory spindle, and/or stabilizing means for stabilizing the disc relative to a recording and/or reproducing head. These means can be arranged within a space available between the first and second holding members.

The above and further objects, aspects and features of this invention will be apparent from the following detailed description of a preferred embodiment thereof taken in connection with the accompanying drawings.

DETAILED DESCRIPTION OF THE PREFERRED EMBODIMENT

The following describes an embodiment of this invention with a rotary magnetic recording disc employed as the record bearing medium. The description includes the arrangement of a cassette containing the medium and having a shutter; a shutter opening and closing mechanism; front and rear holder parts; a cassette loading mechanism; a stabilizer plate raising-and-lowering and center core pressing mechanism; and the operation of a recording and/or reproducing apparatus arranged as the preferred embodiment of this invention. This invention is not limited to the embodiment described herein but is also applicable to other varied types of recording and/or reproducing apparatuses including an optical type, an electrostatic capacity type and a type using a tape-shaped record bearing medium.

Figure 1:
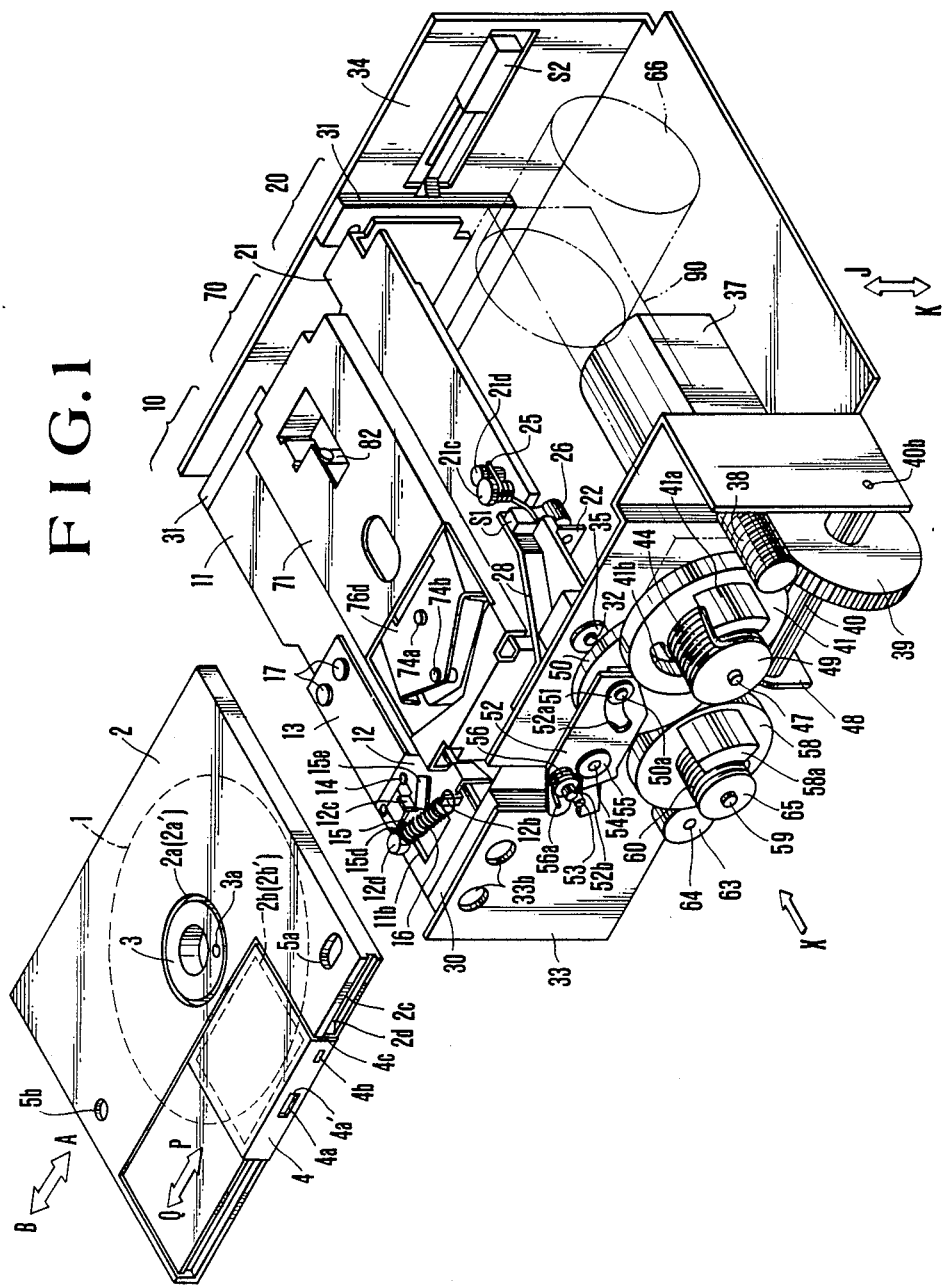
FIG. 1 is an oblique view snowing the overall arrangement of a recording and/or reproducing apparatus arranged according to this invention as an embodiment thereof.

Arrangement of the cassette and the shutter (FIG. 1):

Referring to FIG. 1, a flexible magnetic disc 1 is used as an example of the disc-shaped record bearing medium usable according to this invention. A cassette 2 contains the magnetic recording disc 1. A center core 3, which is secured to the middle part of the magnetic disc 1, is made of a synthetic resin. A PG pin 3a, which is provided for indicating the rotation phase of the disc 1, pierces the center core 3. The pin 3a will be further described later with reference to FIGS. 4A and 4B. A hold 2a is formed in the upper side of the cassette 2 in a position corresponding to the center core 3. A similar hole 2a' is formed also in the lower side of the cassette 2. A window 2b is provided in the upper side of the cassette 2 for allowing a stabilizer plate (74 of FIG. 4A) to enter the cassette 2. Another window 2b' is formed in the lower side of the cassette 2 in a position corresponding to the window 2b and is arranged to allow a magnetic head (94 of FIG. 4A) to enter the cassette 2. The stabilizer plate entering window 2b and the magnetic head entering window 2b' are arranged to be normally covered with a shutter 4 which is arranged to be movable in the directions of arrows P and Q. The shutter 4 is provided with a shutter closing hole 4a which is arranged to have a shutter closing claw (15c of FIG. 2) plunge thereinto and a locking claw 4b which is arranged to engage a shutter lock member 2d. Reference numeral 4a' denotes the end face of the hole 4a and another numeral 4c the end face of the shutter 4. A sliding slit 2c is provided in the side face of the cassette 2 for enabling the shutter closing claw 15c and a shutter opening claw 12a to be slidably fitted therein. The shutter lock member 2d, which is made of a plastic material, is disposed on one side face of the cassette 2. When the shutter 4 moves in the direction of arrow Q relative to the cassette 2, the windows 2b and 2b' for the stabilizer plate and the magnetic head are opened. These windows are closed when the shutter moves in the direction of arrow P.

A pair of positioning holes 5a and 5b are provided in the cassette 2 for use by the apparatus in positioning the cassette 2 at the time of loading. Both the positioning holes 5a and 5b pierce the upper and lower sides of the cassette 2. The hole 5a is in an elliptical shape and is located on the same side as the shutter relative to the direction of arrow A in which the cassette 2 is inserted and is located at a corner part on the upstream side of the shutter 4. The other hole 5b is in a circular shape and is located in the middle of the rear part of the cassette 2 also relative to the direction of arrow A. In the case of this embodiment, the hole 5a also serves as an engaging part to engage an engaging member 26 which will be described later herein. However, in accordance with this invention, the engaging part may be arranged separately from the positioning hole 5a.

Figure 2:
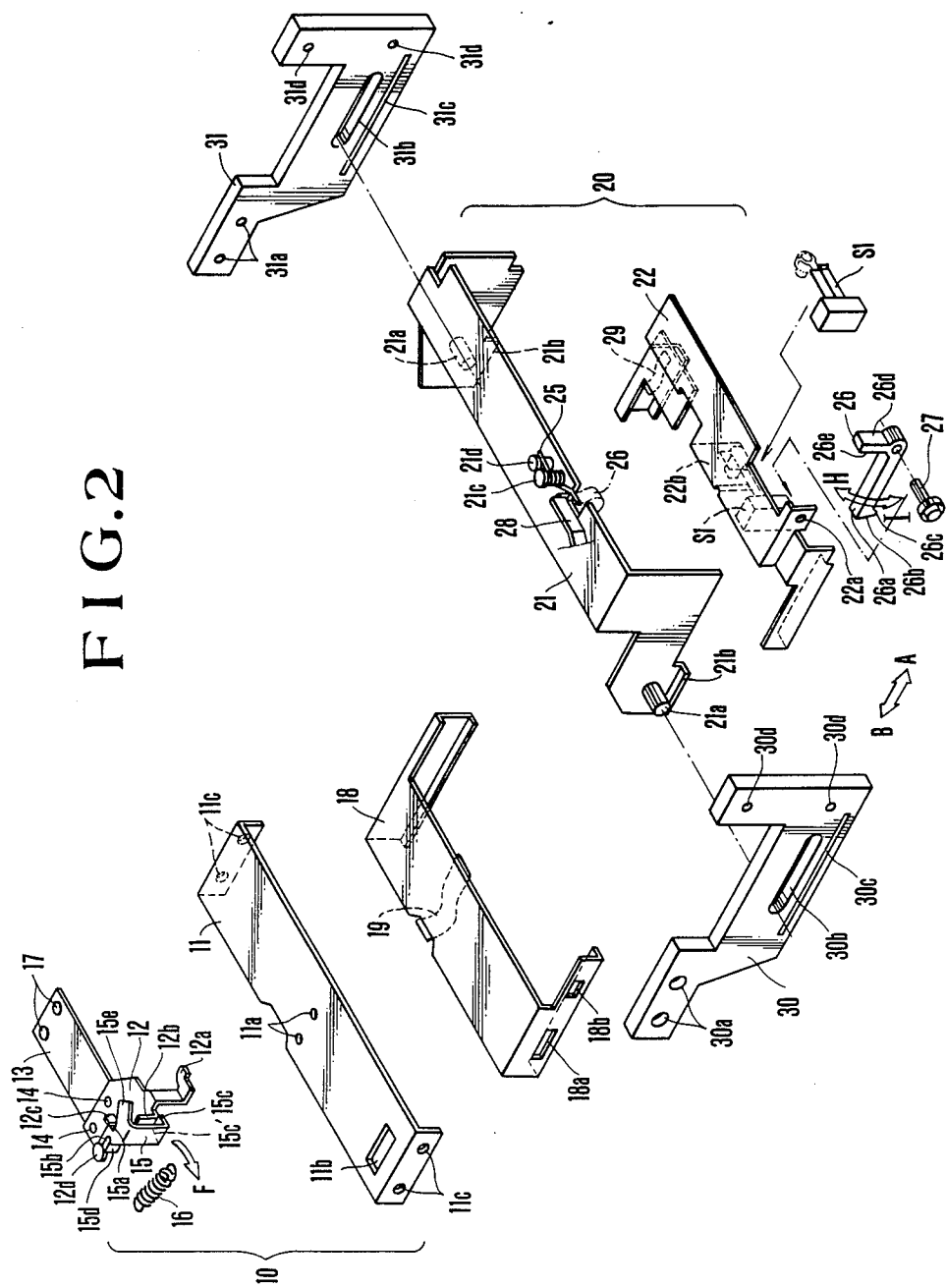
FIG. 2 is an exploded oblique view showing the details of a front holder part and a rear holder part included in the illustration of FIG. 1.

Shutter opening and closing mechanism (FIGS. 1 and 2):

Referring to FIGS. 1 and 2, a cassette holder part for holding the cassette 2 includes a front holder part 10 and a rear holder part 20, which are arranged separately from each other. The front holder part 10 includes a front half 11 and a front holder 18. On the upper surface of the front half 11 is disposed a shutter opening member 12. The member 12 is attached to a leaf spring 13 by means of pins 14 and is provided with an opening claw 12a which is arranged, at a C-shaped bent part thereof, to open the shutter 4. The shutter opening member 12 is further provided with a spring hook part 12b which is arranged, at one end of the member 12, to hook one end of a spring 16. Pins 17 are arranged to secure the shutter opening member 12 at its tail end part to the front half 11 in such a way as to make it vertically swingable on the front half 11. A bent part 12c is arranged to rise from the flat surface of the shutter opening member 12 to engage with a cam part 15e of a shutter closing member 15, which will be described later. A guide pin 12d is erected on the shutter opening member 12 and is thus arranged to stabilize the movement of the shutter closing member 15.

The shutter closing member 15 is disposed on the shutter opening member 12 and is arranged as follows: An end face 15a of the shutter closing member 15 is arranged to abut on one end of the bent part 12c of the shutter opening member 12. A cam part 15e continues from the abutting end face 15a. When the closing member 15 moves relative to the opening member 12, the cam part 15e comes to abut on one end of the bent part 12c of the shutter opening member 12. This causes the closing member 15 to turn in the direction of arrow F on the guide pin 12d. The guide pin 12d has a slot 15b of the closing member 15 fittingly engaged therewith. A closing claw 15e is arranged at a C-shaped bent part of the shutter closing member 15 to close the shutter 4. A spring hook part 15d is provided at one end of the shutter closing member 15. The spring 16 is arranged between the spring hook part 15d and the spring hook part 12b of the shutter opening member 12. The spring 16 is thus arranged to urge the shutter closing member 15 to turn counterclockwise on the guide pin 12d.

The closing claw 15c of the shutter closing member 15 is arranged to plunge into the closing hole 4a of the shutter 4 shown in FIG. 1. The shutter opening claw 12a opens the shutter 4 when the cassette 2 is inserted in the direction of arrow A. Then, the shutter closing claw 15c falls into the hole 4a. When the cassette 2 is taken out in the direction of arrow B, the shutter 4 is closed by means of the claw 15c which is in the hole 4a. To enable the closing claw 15c to easily ride across the edge face 4c of the shutter 4, the claw 15c is provided with a tapered part 15c'.

Front holder and rear holder parts (FIGS. 1 and 2):

The details of the cassette holder parts mentioned in the foregoing are as follows: In the front holder part 10, the front half 11 is arranged to carry the front holder 18 with the latter secured to the former by means of screws or the like, which are not shown. The leaf spring 13 is secured to and carried by the front half 11 by means of pins 17, which are secured at caulking holes 11a. A slot 11b is formed in the front half 11. The vertical part of the cassette closing member 15 is inserted through this slot 11b. Screw holes 11c are provided in the front half 11 for connecting a guide 30 to the front half 11 by means of screws. The front half 11 is thus secured to the guide 30 via facing holes 30a. Another pair of screw holes 11c are symmetrically arranged on the opposite side of the front half 11. A guide 31 on the opposite side and the front half 11 are thus connected to each other also via facing holes 31a provided in the guide 31. In other words, the front half 11 and the guides 30 and 31 are thus arranged to operate in one unified body. A leaf spring 19 is arranged at the ceiling of the front holder 18 to press the cassette 2. The front holder 18 is provided with holes or slots 18a and 18b formed in one side wall of the front holder. The slot 18a serves as an escape hole for the closing claw 15c and the other slot 18b as an escape hole for the opening claw 12a.

In the rear holder part 20, a rear half 21 carries a rear holder 22. The rear holder 22 is attached to the rear half 21 by means of screws or the like. Pins 21a are provided on both sides of the rear half 21 as shown in FIG. 2. These pins 21a are respectively fitted in the slots 30b and 31b provided in the guides 30 and 31. By virtue of this arrangement, the rear half 21 is movable in the directions of arrows A and B along the slots 30b and 31b. The rear half 21 is provided with bent parts 21b which are symmetrically formed on both sides of the rear half 21. These bent parts 21b fit in slits 30c and 31c which are formed in the guides 30 and 31. This prevents the rear half 21 from turning on the pins 21a and, at the same time, allows the rear half 21 to move in the directions of arrows A and B.

Reference numerals 26 and 28 denote an engaging member and a disengaging member, respectively. The engaging member 26 is arranged to engage with the positioning hole 5a of the cassette 2 and, for the reason described hereinafter, has an end part 26a, a tapered part 26b and engaging part 26c thereof preferably either entirely or partially made of a plastic material. A shaft 27 is arranged to pivotally carry the engaging member 26 to permit it to turn in the direction of arrows H and I as shown in FIG. 2. The shaft 27 is secured to the holding part 22a of the rear holder 22 by caulking or the like. FIG. 2 shows a spring 25 as means for urging the engaging member 26 to turn in the direction of arrow I toward the positioning hole 5a. The spring 25 is carried by a shaft 21c and has its rear end attached to a stud 21d. The fore end of the spring 25 is arranged to push the side face 26d of the engaging member. The disengaging member 28 is secured, for example, to a side chassis 33 and is arranged to abut on another side face 26e of the engaging member 26 which is located on the side opposite to the side face 26d while the cassette 2 is not inserted into the apparatus. Under that condition, the spring 25 is prevented from turning the engaging member 26 in the direction of arrow I indicated in FIG. 2. If the engaging member 26 itself is made of some elastic material, such as a leaf spring, and is arranged to have its bent part engageable with the positioning hole 5a, the engaging member 26 can be urged toward the positioning hole 5a without recourse to the use of the spring 25, etc. In that case, the disengaging member 28 may be arranged to act on this bent part to control the engagement of the bent part with the hole 5a.

A leaf spring 29 is arranged to press the cassette 2 while the rear holder 22 is provided with an abutting part 22b. With the abutting part 22b pushed by the cassette 2 when the cassette is inserted, the rear holder 22 slides in the direction of arrow A along the slots 30b and 31b of the guides 30 and 31. A shaft 32 is carried by holes 30d and 31d which are provided in these guides 30 and 31. While the front holder part 10 is arranged to be movable together with the guides 30 and 31 in one unified body with them, the rear holder part 20 is arranged to be movable relative to the guides 30 and 31 along the slots 30b and 31b in the directions of arrows A and B as mentioned above.

A switch S1 is arranged to detect the insertion of the cassette 2. Another switch S2 is arranged in combination with the switch S1. In the case of this specific embodiment, the switch S1 is disposed in a position to operate when the cassette 2 is inserted into the apparatus and comes to abut on the abutting part 22b of the rear holder 22. The switch S2 is disposed in a position to operate when the cassette 2 is further inserted to come to a state as shown in FIG. 3B.

Figure 3A:
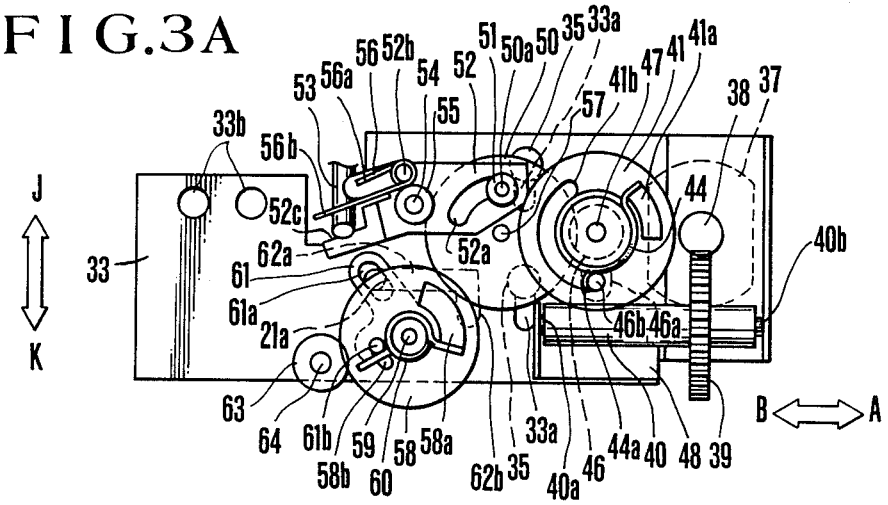
FIGS. 3A, 3B and 3C are side views showing a gear train in different states, as viewed from the direction of arrow X indicated in FIG. 1, FIG. 3A showing it in a state before insertion of a cassette, FIG. 3B in a state at the start of a loading switch operation, and FIG. 3C in a state at the end of cassette loading.
Figure 3B:
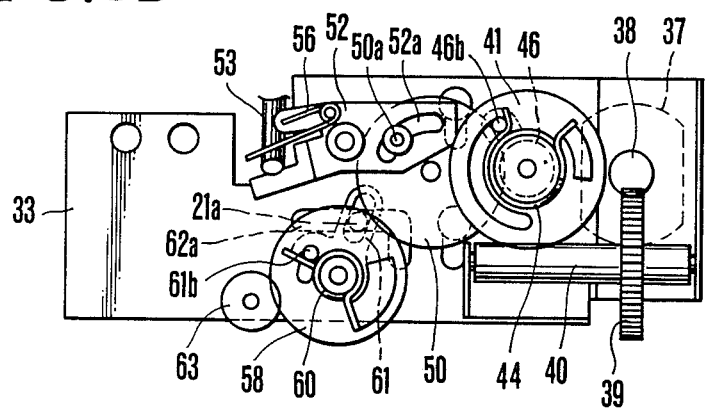
Figure 3C:
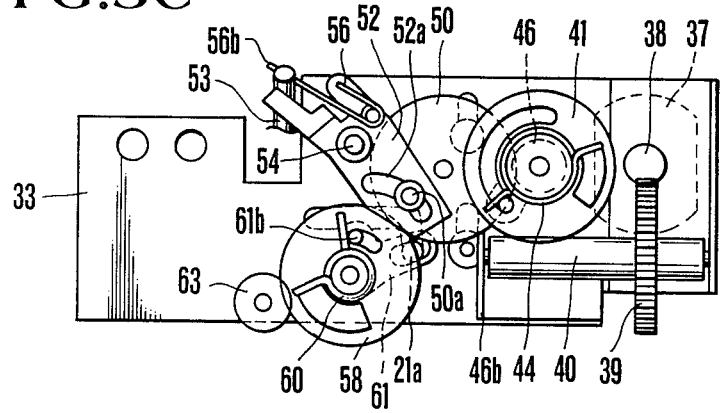

Cassette loading mechanism (FIGS. 1 and 3A–3C):

FIGS. 3A, 3B and 3C are side views of the embodiment as viewed in the direction of arrow X indicated in FIG. 1. These Figures show the various states of the cassette loading mechanism of the embodiment of this invention and particularly the movement of a gear train during a cassette loading operation. FIG. 3A shows the mechanism before loading; FIG. 3B the state of the mechanism at the beginning of the operation of the loading switch S2 (FIG. 1) after cassette insertion; and FIG. 3C the state of the mechanism at the time of completion of the loading operation.

The shafts 32 (FIG. 1) are carried by the holes 30d and 31d which are provided in the guides 30 and 31, two in each of the guides. Two slots 33a are formed in each of the side chassis 33 and a sub-chassis 34 (only the two on the side of the side chassis 33 are shown in FIGS. 3A, 3B and 3C). The shafts 32 are fitted into these slots 33a via rollers 35 (only two of them on the side of the side chassis 33 are shown in FIGS. 3A, 3B and 3C). This arrangement enables the guides 30 and 31 to move in the longitudinal direction of the slots 33a. In other words, they are movable in the directions in which the cassette 2 ascends and descends. Although the side chassis 33 and the sub-chassis 34 are shown as being in one unified body in the Figures, they are preferably arranged to be separable to facilitate the precise mounting work such as caulking on the shafts of the gear train which will be described later. The separable arrangement of these chassis thus facilitates whole assembly work.

The illustration of FIGS. 3A-3C also includes a loading motor 37; a worm gear 38 which is mounted on the output shaft of the motor 37; a worm wheel 39; a worm gear 40 which is arranged to turn together with the worm wheel 39; and another worm wheel 41. The worm wheel 41 is provided with a raised part 41a which is arranged to charge a spring 44 and a thorough slot 41b which is formed in an arcuate shape encircling a shaft 47. A spur gear 46 is disposed on the reverse side of the wheel 41 and is arranged to turn on the shaft 47. A tongue-shaped part 46a of the gear 46 has a pin 46b erected thereon. The pin 46b pierces the slot 41b to have one end of the spring 44 attached thereto. Since the worm wheel 41 and the spur gear 46 are separated from each other, the rotating drive force of the motor 37 is transmitted to the spur gear 46 via the pin 46b. During the rotation of the worm wheel 41, a force develops in the direction of thrust. Therefore, a keep plate 49 (FIG. 1) is arranged to retain the worm wheel 41. A bearing 48 is arranged to pivotally carry the shaft end 40a of the worm gear 40. The other shaft end 40b of the worm gear 40 is carried by the sub-chassis 33.

Figure 4A:
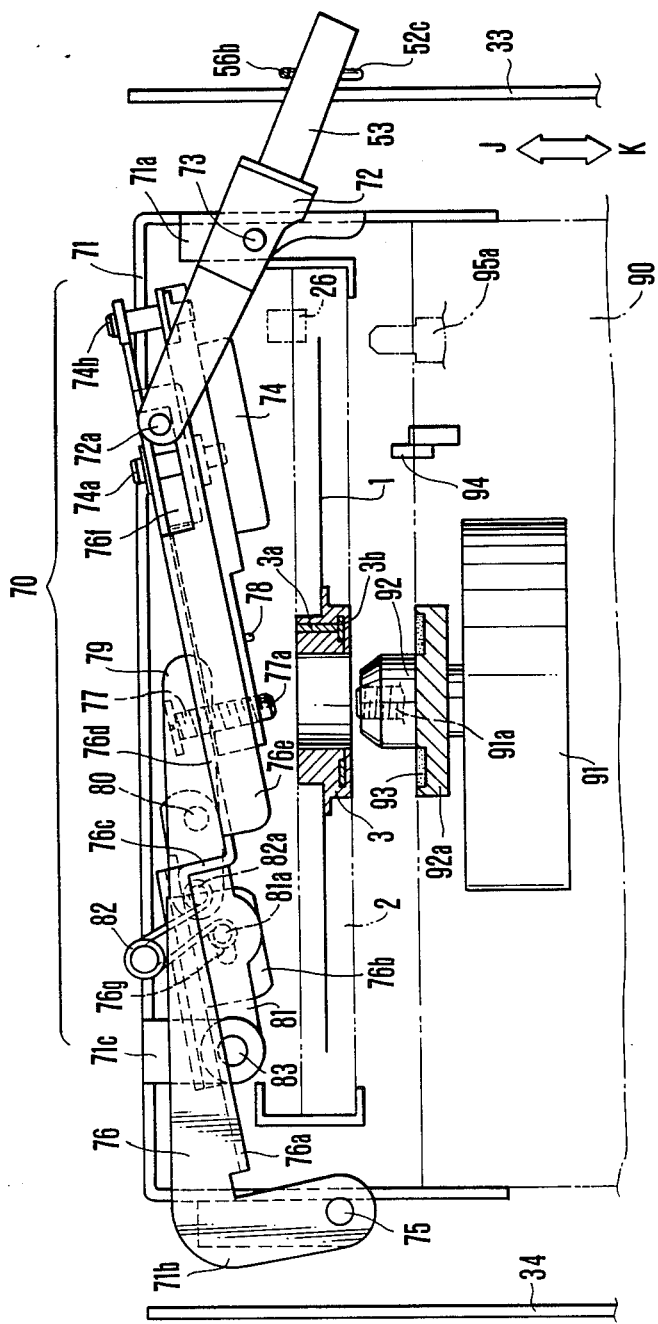
FIGS. 4A and 4B are sectional views showinq the details of a stabilizer plate raising-and-lowering and center core pressing mechanism shown in FIG. 1 in their varied states with the cassette in its raised and lowered positions.

A spur gear 50 is arranged to engage the spur gear 46 and to turn on a shaft 57. A pin 50a is erected on the gear 50. The pin 50a pivotally carries a roller 51 which fittingly engages a cam slot 52a which is provided in a lever 52. The lever 52 is arranged to actuate a lever 53 which causes the ascent and descent of a stabilizer plate 74 (FIG. 4A). The illustration further includes the shaft 54 of the lever 52; a washer plate 55; a pin 52b which is erected on the lever 52 and is arranged to pivotally carry a spring 56, one end 56a of which is secured to the lever 52 while the other end 56b is arranged to urge the end part 52c of the lever 52; and another spur gear 58 which is arranged to engage the spur gear 50 and to turn on a shaft 59. The flat gear 58 is provided with a raised part 58a which is arranged to charge a spring 60 and a thorough slot 58b which is formed in an arcuate shape encircling the shaft 59. A lever 61 is arranged to turn on the shaft 59 of the spur gear 58. The lever 61 is provided with a slot 61a which is arranged to fittingly engage a pin 21a erected on the rear half 21 and a pin 61b which pierces the slot 58b extending toward the surface of the paper of the drawing of FIG. 3A. The pin 61b is urged by the spring 60 to move clockwise. As shown in FIG. 3A, the side chassis 33 is provided with a slot consisting of a horizontally extending part 62a and a vertically extending part 62b. When the spur gear 58 rotates, a rotating driving force is transmitted via the spring 60 to the pin 61b. This causes the lever 61 to turn. The pin 21a which is erected on the rear half 21 moves in the direction of arrow A or B along the slot part 62a and also in the direction of arrow J or K (ascending or descending direction of the cassette 2) along the other slot part 62b.

With the embodiment arranged as described above, the rear holder part 20 is movable in the directions of arrows A and B and also in the directions of arrows J and K. Meanwhile, the front holder part 10 and the guides 30 and 31 are movable only in the directions of arrows J and K. Another set of the members and parts from the spur gear 58 to the slot parts 62a and 62b are arranged on the risen parts of the sub-chassis 34 on the opposite side in a symmetrical manner. The shaft 64 of the spur gear 63 which engages with the flat gear 58 extends toward the sub-chassis 34 to transmit the driving force of the loading motor 37 to the members on the side of the sub-chassis 34. The illustration further includes a washer plate 65; a stepping motor 66 which is arranged to move a recording and/or reproducing head 94 (FIG. 4A) in the radial direction of the magnetic disc 1; and two holes 33b provided in the side chassis 33 (similar holes are symmetrically provided also in the sub-chassis 34). These holes are arranged to permit insertion of screw drivers through them at the last step of assembly work for fixing the front holder part 10 and the guides 30 and 31 in positions.

Figure 4B:
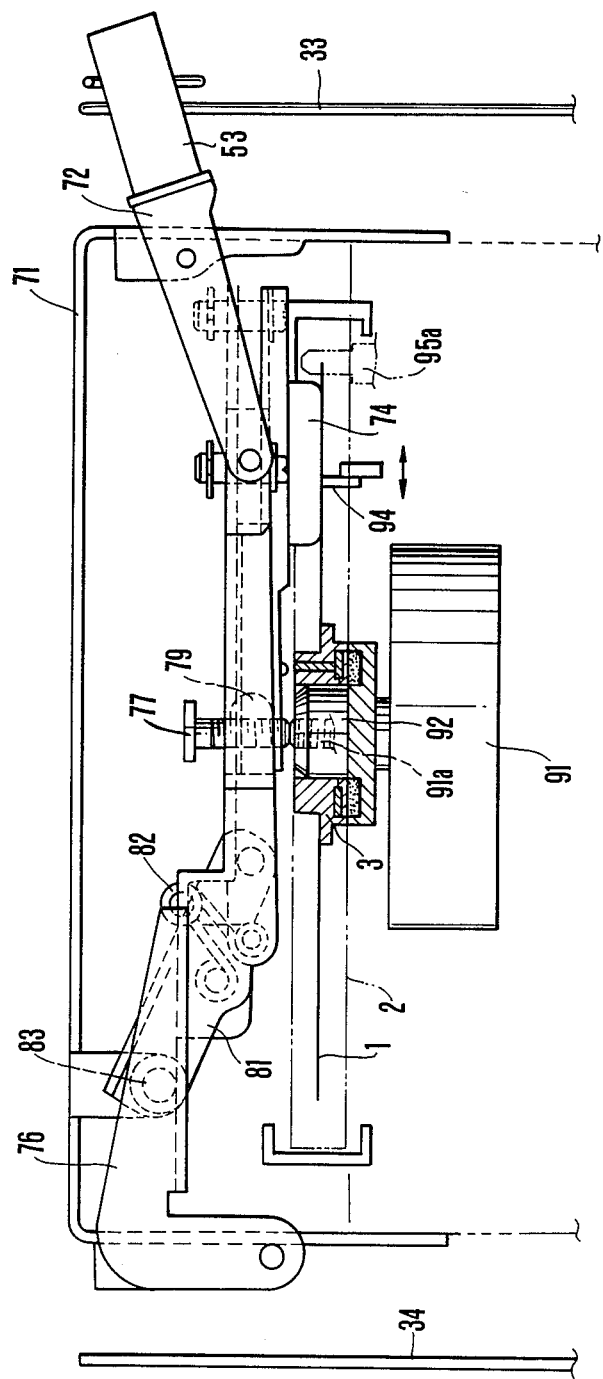

Stabilizer plate raising-and-lowering and center core pressing mechanism (FIGS. 1, 3A-3C and 4A and 4B):

FIGS. 4A and 4B show the stabilizer plate raising-and-lowering and center core pressing mechanism of the embodiment of this invention as viewed in the direction of arrow A indicated in FIG. 1, FIG. 4A showing the cassette 2 as in its raised position and FIG. 4B showing it as in its lowered position. A reference numeral 74 denotes a stabilizer plate. Another numeral 79 denotes a center core pressing member. Referring to FIGS. 1, 4A and 4B, a reference numeral 70 denotes the stabilizer plate raising-and-lowering and center core pressing mechanism. A frame 71 is arranged to have the mechanism 70 mounted thereon. A reference numeral 90 denotes the body of the apparatus. A disc rotating motor 91 shown in FIG. 4A is of the outer rotor type. The motor 91 includes a fixed shaft 91a which is disposed in the middle thereof; and a receiving part which is arranged at the fore end thereof to receive the abutting part 77a formed at the fore end of a screw 77. In FIG. 4A, a positioning pin 95a is shown as arranged to cooperate with the positioning hole 5a in positioning the cassette 2. However, another positioning pin for the other positioning hole 5b is omitted from the drawing. The frame 71 is secured to the apparatus body 90. In this specific embodiment, all the arrangements and members participating in the pressing or pushing operation on the center core 3 and the vertical moving operation on the stabilizer plate 74, are mounted on the frame 71. A lever 72 is pivotally supported via a shaft 73 by a bent part 71a of the frame 71. The lever 72 is provided with a pin 72a which is erected on the fore end part of the lever and a stabilizer plate moving lever 53 which is erected on the rear end part thereof. The lever 72 is urged to turn on a shaft 73 by one end 56b of the spring 56.

The stabilizer plate 74 is provided for the purpose of stabilizing the rotation of the magnetic disc 1 by keeping the head 94 and the disc 1 in satisfactory contact with each other, or by keeping them confronting each other across an air layer of thickness not exceeding 0.5 $\mu$m (for example) or, under a recording or reproducing condition. Although it is not shown in the drawing, another stabilizer plate may be arranged beneath the magnetic disc 1. The plate 74 is provided with pins 74a and 74b. These pins are arranged to be used for hanging the stabilizer plate 74 by means of a lever 76 which will be described later. A conical coiled spring (not shown) is interposed in between the lever 76 and the stabilizer plate 74. The stabilizer plate 74 is thus always urged in the direction of arrow K in relation to the lever 76 as shown in FIG. 4A.

The lever 76 is pivotally supported by a bent part 71b of the frame 71 and is in the following shape: The lever 76 has a wide part which extends sideways in the neighborhood of the shaft 75 in parallel with the paper surface of the drawing. The wide part extends upward to a certain extent and then perpendicularly bends. On the lower side of the bent part, a portion 76a extends from the paper surface side of the drawing to the back surface side of the paper. Then, on the back side, a part of the lever 76 bends downward to form a part 76b. Another part 76d comes, via a stepped part 76c, to extend from the paper surface side to the back surface side. A part 76e of he lever is arranged to extend downward on the paper surface side of the drawing as viewed on FIG. 4A. A slot 76f is formed in the part 76e of the lever 76. The pin 72a fittingly engages with the slot 76f. A screw 77 is threaded and has its fore end abutting part 77a arranged to abut on the fore end of the central fixed shaft 91a of the motor 91 thus permitting adjustment of the height of the stabilizer plate 74. The apparatus body 90 is provided with two receiving parts which are not shown but are arranged to receive the stabilizer plate 74 when the plate comes down. The urging force exerted on the stabilizer plate 74 in the direction of arrow K is arranged to be sustained by three parts including these receiving parts and the fore end of the central fixed shaft 91a of the motor 91. A numeral 78 denotes one end of a PG yoke having a PG coil which is wound around the yoke.

A center core pressing member 79 is provided for the purpose of having the center core 3 accurately fitted on a spindle 92. The member 79 is forked in such a way not to overlap the spindle 92 and is pivotally supported by a shaft 80 on a lever 81 which will be described later. One end 82a of a toggle spring 82 is connected to the pressing member 79. The other end of the toggle spring 82 is connected to a pin 81a which is erected on the lever 81. The pin 81a is fitted into the slot 76g formed in the lever 76. The lever 81 is pivotally supported by the bent part 71c of the frame 71 via a shaft 83.

In FIG. 4A, a numeral 3a denotes the above-stated PG pin. The pin 3a is secured by planting or the like to a ring 3b which is made of a magnetizable material and is secured to the center core 3. The spindle 92 is provided with a flange part 92a. A permanent magnet 93 is attached to the flange part 92a. The magnetic flux of the permanent magnet 93 passes through the ring 3b and the PG pin 3a to produce a leakage magnetic flux to the outside of the center core 3. The magnetic flux flowing to the PG yoke 8 reaches a maximum value when the PG pin 3a comes to a point opposite to the PG yoke 8 with the center, core 3 rotated. The magnetic flux decreases, accordingly, as the PG pin 3a moves away. By this, a voltage which varies with time is developed at the coil wound on the PG yoke 78, so that the rotation phase of the magnetic disc 1 can be detected through this voltage. Further, it is possible to arrange the spindle 92 to be mechanically coupled with the center core 3 by virtue of the magnetic action of the permanent magnet 93 and the ring 3b.

The operation of a recording and/or reproducing apparatus embodying this invention (FIGS. 1–4B):

A recording and/or reproducing apparatus embodying the arrangement of this invention as shown in FIGS. 1 to 4B operates as described below. The description will be made in the order of a cassette loading operation and the shutter opening and closing operation in association therewith; the ascent and descent of the stabilizer plate and the center core pressing operation; and an unloading operation.

When the operator manually inserts the cassette 2 into the cassette holder, the cassette 2 first comes into contact with the abutting part 22b of the rear holder 22 (FIG. 2). The cassette 2 is pushed further in the direction of arrow A. This causes the whole rear holder part 20 to be pushed in the direction of arrow A. The cassette insertion detection switch S1 comes to operate under this condition. With the rear holder part 20 thus moved, the lever 61 is caused via the pin 21a to turn clockwise. Then, the pin 61b erected on the lever 61 causes the gear 58 to turn clockwise. The spur gear 50 which is engaging the gear 58 turns counterclockwise. The gear 46 which is engaging the spur gear 50 turns clockwise. Meanwhile, the worm wheel 41, which is disposed on the front side of the gear 46, does not turn. Therefore, the pin 46b, which is disposed on the tongue shaped part 46a of the gear 46, charges the spring 44 while turning clockwise along the slot 41b provided in the wheel 41. The counterclockwise turn of the gear 50, on the other hand, causes the pin 50a which is provided on the spur gear 50 to move counterclockwise. During this process, however, the lever 52 does not turn on the shaft 54 because of the shape of the cam slot 52a provided in the lever 52.

FIG. 3B shows the gear train, etc., mentioned above as in their rotated state obtained as a result of the manual insertion of the cassette 2. Under this condition, the cassette loading switch S2 which is shown in FIG. 1 is operated by the shoulder part of the rear half 21. In response to the operation of the switch S2, the loading motor 37 begins to rotate in the loading direction. Then, if the operator removes his or her hand from the cassette 2 before there obtains the condition of FIG. 3B, the returning force of the spring 44 brings the pins 46b and 21a back to their positions of FIG. 3A and the cassette 2 is then ejected or discharged to the outside. Loading begins when there obtains the condition of FIG. 3B. The rotatory driving force of the loading motor 37 is transmitted to the worm gear 38, worm wheel 39, worm gear 40 and worm wheel 41. The worm wheel 41 turns clockwise. When the worm wheel 41 turns to a degree corresponding to the length of the slot 41b, the pin 46b and, accordingly, the gear 46 turn clockwise. The spur gear 50 turns counterclockwise. The gear 58 turns clockwise. Further, the spring 60 causes, via the pin 61b, the lever 61 to turn clockwise. As a result of that, each of the pins 21a which is fitted in the slot 61a moves in the direction of arrow A along the slot 62a of the side chassis 33 or the similar slot provided in the sub-chassis 34. The rear holder part 20 is thus caused to move in the direction of arrow A by the driving force of the loading motor 37. Then, the cassette 2 is pulled further into the front holder 18.

The operations of the engaging member 26 and the disengaging member 28 are as follows: When the cassette 2 is not inserted as shown in FIGS. 1 and 3A, the rear holder part 20 is urged by the urging force of the spring 44 which is exerted in the direction of arrow B as indicated in FIG. 3A. This is because the urging force of the spring 44 is urging the pin 21a to move toward the left end of the slot 62a via the engagement among the gear train 46, 50 and 58. Under this condition, the engaging member 26 abuts on the disengaging member 28 and is in a position to which it has been brought by the disengaging member 28 turning on the shaft 27 in the direction of arrow H. With the engaging member 26 in this position, the cassette 2 can be inserted in a direction from the paper surface to the reverse side of the paper as viewed in FIG. 4A. In case where there is room in the height of the apparatus, the end part 26a of the engaging member 26 may be arranged to be located beneath the stabilizer plate 74 leaving some clearance to have it not in contact with the plate 74. In the case of an apparatus of the kind arranged to have the cassette 2 loaded from the front, and particularly, in the case of a recording and/or reproducing apparatus of the kind using a still video cassette as in the case of this specific embodiment of the invention, the stabilizer plate raising-and-lowering and center core pressing mechanism 70 inevitably comes to have the largest height within the apparatus. Therefore, arrangement to reduce the height of this part contributes to reduction in the thickness of the whole apparatus. In view of this, in this specific embodiment, the tapered fore end part 26b of the engaging member 26 is arranged to overlap to a slight extent the cassette 2 in the direction of thickness of the cassette 2. When the cassette 2 is inserted under this condition, the tapered part 26b is pushed by the end face of the cassette 2. Then, the engaging member 26 turns further in the direction of arrow H against the urging force of the spring 25 which is exerted on the side face of the engaging member 26. The end part 26a of the member 26 comes into contact with the stabilizer plate 74 and thus pushes the stabilizer plate 74 to a slight extent upward in the direction of arrow J as indicated in FIG. 4A. This movement is then absorbed by a play or the like left between the pin 72a of the fore end of the lever 72 and the slot 76f of the lever 76 within the mechanism 70. The engaging member 26, or at least a part of it, is preferably made of a plastic material for the following reason: If the engaging member 26 is made of a metal or the like, the lower surface of the stabilizer plate 74 and a part of the cassette 2 around the positioning hole 5a would be damaged. Then, such damage might come to hinder normal recording or reproduction. Whereas, the use of a plastic material for the engaging member never causes such inconvenience.

With the cassette 2 inserted, when it pushes the abutting part 22b of the rear holder 22, the whole rear holder part 20 is moved in the direction of arrow A. The engaging member 26 then moves away from the disengaging member 28. The urging force of the spring 25 causes the engaging member 26 to turn in the direction of arrow I. The engaging part 26c of the member 26 then comes to engage with the positioning hole 5a of the cassette 2. In this instance, with the tapered part 26b, the shape of the engaging part 26c and the position of the spring 29 suitably arranged, even a small urging force of the spring 25 gives a sufficiently large force for pulling the cassette 2 in the direction of arrow A via engagement with the engaging member 26. Therefore, the cassette loading operation can be accurately accomplished.

In pulling out the cassette 2 on the other hand, the disengaging member 28 again abuts on the engaging member 26 when the rear holder part 20 which carries the cassette 2 comes back to the disengaging member 28. The engaging member 26 then turns in the direction of arrow H against the urging force of the spring 25. This causes the engaging part 26c of the engaging member 26 to move away from the positioning hole 5a to permit the cassette 2 to be pulled out further in the direction of arrow B indicated in FIG. 2.

In accordance with the arrangement described, therefore, the cassette 2 can be engaged with and disengaged from the cassette holder part without fail by virtue of the engaging member 26, the spring 25 and the disengaging member 28. Unlike the conventional arrangement, the spring which is arranged within the cassette holder part to press and hold the cassette, does not have to have a large pressing force. Besides, the cassette 2 is never damaged by virtue of the arrangement described.

The arrangement of the embodiment described to have the record bearing medium container engaged and disengaged by means of the engaging and disengaging members is based on U.S. patent application Ser. No. 777,235 to Uehara, entitled "Recording and/or Reproducing Apparatus", assigned to the same assignee and filed on Sept. 18, 1985. Meanwhile, the loading device including the separate medium container holding members, which represents a main feature of the present invention, is applicable also to an apparatus having container fixing and holding means differently arranged from the one described in the foregoing.

When the motor 37 begins to perform the loading action, each of the pins 21a moves in the direction of arrow A along the slot 62a and then moves in the direction of arrow K along the slot 62b. The pins 21a pierce the slots 30b and 31b of the guides 30 and 31 while the bent parts 21b provided on both sides of the rear half 21 are fitted into the slits or slots 30c and 31c of the guides 30 and 31. Therefore, the guides 30 and 31 do not move when the pins 21a moves in the direction of arrow A. Further, when the pins 21a move in the direction of arrow K, the rollers 35, which fittingly engage the slots 33a provided in the side chassis 33 and similar slots provided in the sub-chassis 34, prevent any rattling in the directions of arrows A and B to ensure smooth movement in the direction of arrow K. This enables the front holder part 10, which is secured to the guides 30 and 31, to move also in the direction of arrow K. In other words, the front holder part 10 is movable only in the directions of arrows J and K while the rear holder part 20 is movable not only in the directions of arrows J and K but is movable also in the directions of arrows A and B.

The reason for arranging the front holder part 10 not to be movable in the directions of arrows A and B is as follows: Before that, however, let us briefly describe the shutter opening and closing arrangement. Before the cassette 2 is inserted into the cassette holder part, the lock claw 4b engages a recess which is not shown but is provided in the shutter lock member 2d. The claw 4b thus prevents the shutter 4 from being opened. When the cassette 2 is manually inserted into the cassette holder part in the direction of arrow A, the closing claw 15c of the cassette closing member 15 and the opening claw of the cassette opening member 12 fittingly engage a groove 2c provided in one side face of the cassette 2 and slide along the groove 2c. Then, the closing claw 15c first engages the shutter lock member 2d at its tapered part 15c'. The closing member 15 then turns on the pin 12d against the force of the spring 16 in the direction of arrow F (FIG. 2). The closing claw 15c thus rides on the side face of the shutter 4. At this moment, the opening claw 12c is located before the shutter lock member 2d. When the cassette 2 is further pushed in, the closing claw 15c plunges into the shutter closing hole 4a. The opening claw 12a then pushes the lock member 2d to disengage the lock claw 4b from the above-stated recess. The shutter 4 is thus left there while the cassette 2 is further inserted in the direction of arrow A as the opening claw 12a then abuts on the side face 4c of the shutter 4. With the shutter 4 thus left behind, the stabilizer inserting window 2b and the magnetic head inserting window 2b' are exposed according as the cassette 2 is further inserted.

In taking the cassette 2 out in the direction of arrow B, the closing claw 15c plunges into the shutter closing hole 4a to abut on the end face 4a' thereof. The shutter 4 thus comes to close the above-stated windows 2b, and 2b' accordingly, as the cassette 2 moves in the direction of arrow B. With the shutter 4 having been completely closed, the lock claw 4b of the shutter 4 engages the above-stated recess of the shutter lock member 2d. The shutter 4 is thus locked. When the cassette 2 is further pulled out in the direction of arrow B under this condition, the closing member 15 which has its closing claw 15c abutting on the end face 4a' of the shutter closing hole 4a comes to slide relative to the opening member within the slot 15b. Then, the cam part 15e of the closing member 15 abuts on the bent part 12c of the opening member 12. This causes the closing member 15 to turn on the guide pin 12d in the direction of arrow F as indicated in FIG. 2. The closing claw 15c detaches from the hole 4a to allow the cassette 2 to come back to its state before the inserting operation.

The movement of the cassette 2 and the front holder part 10 relative to each other is as follows: The closing and opening members 15 and 12 for the shutter 4 are mounted on the front half 11 as mentioned in the foregoing. Therefore, if the front holder part 10 is arranged to move in the direction of arrow A together with the cassette 2 when the cassette is inserted, the shutter opening claw 12a would move at the same speed as the cassette 2. Then, it would be impossible to open the shutter 4. Likewise, in case of unloading, the shutter opening claw 15c would move at the same speed as the cassette 2 in the direction of arrow B and then it would also be impossible to close the shutter 4. Whereas, arrangement to have the front holder part 10 move at a speed different from that of the cassette 2 makes it possible to open and close the shutter 4. However, this arrangement becomes complex. This embodiment solves this problem by arranging the front holder plate 10 immovable in the directions of arrows A and B. The arrangement permits simplification of structural arrangement and reduction in the cost of manufacture.

In loading the cassette 4 by rotating the motor 37, the gear train of FIG. 3A continues to turn even after the pins 21a have moved along the slot 62a. The pins 21a descend in the direction of K along the slots 62b and come to a stop at the lower edges of these slots 62b. Meanwhile, the gear train further turns. The motor stopping switch (not shown) then comes to operate when the spring 60 is completely charged. The motor 37 then comes to a stop. FIG. 3C shows this condition. The pins 21a are urged in the direction of arrow K by the urging forces of the springs 60. Therefore, the springs 19 and 29 urge the cassette 2 to move downward within the apparatus body 90. In the case of the conventional apparatus, a resilient spring is disposed in a position approximately corresponding to the springs 19 and 29 and the engaging part 26c of the engaging member 26. However, the conventional spring is arranged to cause a positioning member which is arranged for the purpose of setting a datum plane to have the reverse side of the cassette 2 come to abut thereon. Whereas in the case of this specific embodiment, no resilient spring is arranged in the neighborhood of the engaging part 26c. The cassette 2 is urged by an urging force of the spring 25 exerted on the engaging member 26 in the direction of arrow I without having any additional spring. Therefore, in accordance with the arrangement of this embodiment, the cassette 2 can be surely loaded without recourse to the pushing force of an additional resilient spring.

The operation of the stabilizer plate raising-and-lowering and center core pressing mechanism 70 during a cassette loading operation is as follows: When there obtains the state of FIG. 3B, the loading motor 37 begins to operate as mentioned in the foregoing. The spur gear 50 is driven by the engagement of the gear train to turn counterclockwise. This causes the pin 50a and the roller 51 to turn round. Then, after the state of FIG. 3B, the cam slot 52a of the lever 52 allows the lever 52 to turn clockwise on the shaft 54. With the lever 52 beginning to turn clockwise (see FIG. 3C), the stabilizer plate moving lever 53, which has been urged by the other end 56b of the spring 56 to move toward the lever 52, comes to turn counterclockwise on the shaft 73 as shown in FIG. 4A. Then, the pin 72a which is provided at the fore end of the lever 72 also turns counterclockwise.

The lever 76 is at first kept in the state of FIG. 4A. However, since the slot 76f of the lever 76 is in fitting engagement with the pin 72a, the lever 76 comes to turn clockwise on the shaft 75, accordingly, as the pin 72a moves in the direction of arrow K and also comes to descend in the direction of arrow K. The descent of the lever 76 causes the forked fore end part of the center core pressing member 79 to push the center core 3 of the magnetic disc onto the spindle 92. The toggle spring 82 is arranged to have two stabilized positions including a first stable position as shown in FIG. 4A and a second stable position as shown in FIG. 4B. During the pressing operation of the center core pressing member 79, the toggle spring 82 is in the first stable position, as long as the reaction of the center core 3 does not come to exceed a certain limit, to keep the pressing member 79 in a position relative to the lever 81 as shown in FIG. 4A. When the reaction exceeds the above-stated limit, however, the toggle spring 82 shifts to the second position as shown in FIG. 4B. The pressing member 79 then turns relative to the lever 81 and escapes in a direction different from the above-stated pressing direction, for example, in a direction opposite to the pressing direction. FIG. 4B shows a loading completed state of the embodiment. The pressing member 79 stays away from the magnetic disc 1 during a recording or reproducing operation to impose no unnecessary load on the disc rotating motor 91. Thus, the center core 3 of the magnetic disc 1 is pressed and fitted on the spindle 92 without fail. In unloading the cassette 2, the pressing member 79, which is in the above-stated escaped position, turns counterclockwise together with the lever 76. During the counterclockwise motion, the member 79 comes into contact with the frame 71. The toggle spring 82 comes back to the first stable position. The pressing member 79 then comes to turn clockwise on the shaft 80 relative to the lever 81. The embodiment thus comes back to the state as shown in FIG. 4A.

Under the condition as shown in FIG. 4B, a switch (not shown) operates to bring the loading motor 37 to a stop. The disc rotating motor 91 and the stepping motor 66 (FIG. 1) begin to rotate. The magnetic disc 1 rotates. The driving force of the stepping motor 66 causes the magnetic head 94 to have access to a selected recording track on the magnetic disc 1. A recording or reproducing operation is performed. For this operation, the stabilizer plate 74 comes down to a position in which the plate 74 is either in contact with the rotary magnetic disc 1 or is opposed to the disc 1 across an air layer of a predetermined thickness, so that they can be kept in a desired contacting or confronting state. In this instance, the height of the stabilizer plate 74 relative to the disc 1 is adjustably defined by means of the screw 77 which is mounted on the lever 76 and is abutting on the fore end of the fixed shaft 91a of the motor 91.

Support means for supporting the stabilizer plate raising-and-lowering and center core pressing mechanism in the above embodiment is based on U.S. patent application Ser. No. 777,229 to Uehara et al., entitled "Recording and/or Reproducing Apparatus", assigned to the same assignee and filed on Sept. 18, 1985. The center core pressing device including the pressing member 79 and the stabilizer plate 74 are mounted on a common lever 76. The pressing operation and the pressure releasing operation on the center core 3 and the vertical moving operation on the stabilizer plate are thus arranged to be accomplished both by the turning motion of the lever 76.

The arrangement permits unitized assembly work on these parts, so that assembly work on the whole apparatus can be simplified and rationalized. Further, since these parts are arranged to be mounted on the apparatus body via the frame 71, an assembly, which has been subjected to adjustment called head-touch adjustment made on the apparatus body, can be mounted as it is on the loading device. Further, a deviation of the center core pressing position due to a positional deviation resulting from an error in coupling work on the apparatus body and the loading device and variations in the pressing force, can be either eliminated or lessened.

The loading device including the separate medium container holding members, which represents an important feature of this invention, is applicable not only to the apparatus described but also to an apparatus having support means for supporting the stabilizer plate raising-and-lowering and center core pressing mechanism arranged in a different manner.

In the last place, the unloading operation of the apparatus described above is described as follows: The loading motor 37 comes to rotate in a direction reverse to the rotation for loading in response to an operation such as pushing an eject key or the like which is not shown. The lever 76 then turns counterclockwise on the shaft 75. During the counterclockwise turning lever 76, the action of the toggle spring 82 brings the pressing member 79 back to its position relative to the lever 81 as shown in FIG. 4A. Meanwhile, the rear holder part 20 and the front holder part 10 move upward in the direction of arrow J as shown in FIGS. 1 and 3A. The rear holder part 20 then moves in the direction of arrow B to enable the cassette 2 to be taken out to the outside of the apparatus. When the rear holder part 20 comes back to the position of the disengaging member 28 shown in FIGS. 1 and 2, the member 28 causes the engaging member 26 to disengage from the positioning hole 5a. When the cassette, 2 reaches a predetermined point, a switch (not shown) operates to bring the loading motor 37 to a stop. The unloading operation then comes to an end.

In accordance with this invention, as described in the foregoing, a recording and/or reproducing apparatus is provided with a first holding member arranged to hold a record bearing medium container; and a second holding member which is disposed behind the first holding member relative to the container inserting direction and is arranged separately from the first member to hold the container in conjunction with the first member. Compared with the arrangement of the conventional apparatus, the container holding part of the embodiment can be easily assembled and adjusted.

The second holding member is provided with moving means which is arranged to enable the second holding member to be movable not only in a first direction but also in a second direction which differs from the first direction. Meanwhile, the first holding member is provided with moving means which is arranged to enable the first holding member to be movable solely in the second direction. This ensures that, despite of the divided arrangement of the above-stated holding part, the record bearing medium container can be safely loaded and unloaded without fail.

Further, the arrangement of the means for moving in the first direction the shutter which opens and closes the window parts of the record bearing medium container enables the shutter operating device disposed on the above-stated first holding member, so that this device can be simply arranged.

While a specific embodiment of the invention has been shown and described in detail to illustrate the application of the inventive principles, it will be understood that the invention may be embodied otherwise without departing from such principles.

What is claimed is:

1. A recording and/or reproducing apparatus using a record bearing medium housed in a housing, said housing being provided with at least one window to expose a portion of the medium, and the housing being insertable into the apparatus along a predetermined first direction, said apparatus comprising:
   (a) first holder means for receiving and holding the housing, said first holder means being arranged to receive the housing from said first direction and movable in a predetermined second direction which is different from said first direction to place the housing at a predetermined loading position;
   (b) second holder means for holding the housing with said first holder means, said second holder means being movably disposed relative to said first holder means in said first direction, said second holder means being movable between a first position where said second holder means is moved relatively to said first holder means to come close to said first holder means and a second position where said second holder means is moved to be separated from said first holder means in said first direction, said second holder means being movable also in said second direction; and
   (c) head means for recording signals on and/or reproducing second signals from the medium, said head means being located between said first holder means and said second holder means being arranged to confront a surface of the medium through the window of the housing when said housing is positioned at said loading position.

2. The apparatus according to claim 1, wherein said housing includes a cassette.

3. A record bearing medium container loading device for a recording and/or reproducing apparatus, comprising:

(a) first holder means for receiving and holding said container;
(b) second holder means for holding the container simultaneous with said first holder means, said second holder means being separated from the first holder means and disposed behind the first holder means along an insertion direction of the container;
(c) moving means for moving said first holder means along a predetermined first direction which is different from said insertion direction of the container and for moving said second holder means along said first direction and along a predetermined second direction which is parallel to the insertion direction of the container; and
(d) pull-in means for pulling the container into said device, said pull-in means being provided on said second holder means.

4. The device according to claim 3, wherein said container has a movable cover for closing a window of the container; and the device further comprises:
operation means for moving the cover member relative to the container to open the window, said operation means being provided on said first holder means.

5. A record bearing medium container loading device for a recording and/or reproducing apparatus, wherein said container has a movable cover for closing a window of the container, the loading device comprising:
(a) first holder means for receiving and holding said container inserted in a first direction through an opening;
(b) second holder means for holding the container with said first holder means, said second holder means being movably disposed relative to said first holder means in said first direction, said second holder means being movable between a first position where said second holder comes close to said first holder means at a side of said opening and a second position where said second holder means is moved to be separated from said first holder means in said first direction;
(c) moving means for moving said first holder means along a second direction which is different from said first direction of the container and for moving said second holder means along said second direction and along a predetermined third direction which is parallel to the first direction of the container; and
(d) operation means for moving the cover member relative to the container to open the window according to the insertion of said container into said first hold means in said first direction, said operation means being provided on said first holder means.

6. A record bearing medium container loading device for a recording and/or reproducing apparatus, comprising:
(a) first holder means for receiving and holding said container;
(b) second holder means for holding the container simultaneous with said first holder means, said second holder means being separated from the first holder means and disposed behind the first holder means along an insertion direction of the container; and
(c) pull-in means for pulling the container into said first holder means, said pull-in means being provided on said second holder means.

7. The device according to claim 6, wherein said container has a movable cover for closing a window of the container; and the device further comprises:
operation means for moving the cover member relative to the container to open the window, said operation means being provided on said first holder means.

8. A record bearing medium container loading device for a recording and/or reproducing apparatus wherein said container has a movable cover for closing a window of the container, the loading device comprising:
(a) first holder means for receiving and holding said container inserted in a first direction;
(b) second holder means for holding the container with said first holder means, said second holder means being movably disposed relative to said first holder means in said first direction, said second holder means being movable between a first position where said second holder means comes close to said first holder means and a second position where said second holder means is moved to be separated from said first holder means;
(c) moving means for moving said first holder means along a second direction which is different from said first direction of the container and for moving said second holder means along said second direction and along a predetermined third direction which is parallel to the first direction of the container.

9. A recording and/or reproducing apparatus using a record bearing medium housed in the housing, said housing being provided with at least one window to expose a portion of the medium, and the housing being insertable into the apparatus along a predetermined first direction, said apparatus comprising:
(a) first holder means for receiving and holding the housing, said first holder means being arranged to receive the housing from said first direction and movable in a predetermined second direction which is different from said first direction to place the housing at a predetermined loading position;
(b) second holder means for holding the housing with said first holder means, said second holder means being movably disposed relative to said first holder means in said first direction, said second holder means being movable between a first position where said second holder means is moved relatively to said first holder means to come close to said first holder means and a second position where said second holder means is moved to be separated from said first holder means in said first direction, said second holder means being movable also in said second direction; and
(c) drive means for rotating the medium, said drive means having an engaging member to engage with a portion of the medium through the window of the housing and being located between said first holder means and said second holder means when said housing is positioned at said loading position.

10. In a recording and/or reproducing apparatus using a record bearing medium housed in a cassette, a cassette loading device comprising:
(a) a first cassette holder for receiving and holding the cassette, said first holder being arranged to receive the cassette from a predetermined first direction and movable in a predetermined second direction which is different from said first direction;

(b) a second cassette holder for holding the cassette simultaneous with said first holder, said second holder being separated from the first holder and disposed behind the first holder along said first direction, said second holder being movable in said first and said second directions; and (c) moving means for moving said first and said second holders, said moving means being arranged to firstly move the second holder in said first direction and thereafter move the second holder, which has moved in said first direction, and the first holder in said second directions; and (d) pull-in means for pulling the cassette into said device, said pull-in means being provided on said second holder and pulling the cassette when the second holder is moved along said first direction.

11. The device according to claim 10, wherein the cassette has at least one positioning hole; and said pull-in means includes an engaging member engageable with the positioning hole of the cassette to pull the cassette into said first holder.

12. The device according to claim 10, wherein said cassette has a window and a shutter for closing the window, said shutter being movable along said first direction relative to the cassette when the cassette is inserted into said device; and the device further comprises:

operation means for moving the shutter relative to the cassette to open the window when the cassette is inserted and pulled into said device, said operation means being provided on the first holder.

13. In a recording and/or reproducing apparatus using a record bearing medium housed in a cassette, wherein said cassette has a window and a shutter for closing the window, said shutter being movable along said first direction relative to the cassette when the cassette is inserted into said first holder, a cassette loading device comprising:

(a) a first cassette holder for receiving and holding the cassette, said first holder being arranged to receive the cassette from a predetermined first direction and movable in a predetermined second direction which is different from said first direction;

(b) a second cassette holder for holding the cassette simultaneous with said first holder, said second holder being separated from the first holder and disposed behind the first holder along said first direction, said second holder being movable in said first and said second directions;

(c) moving means for moving said first and said second holders, said moving means being arranged to firstly move the second holder in said first direction and thereafter move the second holder, which has moved in said first direction, and the first holder in said second directions; and (d) operation means for moving the shutter relative to the cassette to open the window when the cassette is inserted into said device, said operation means being provided on the first holder.

14. A recording and/or reproducing apparatus using a disc-shaped record bearing medium housed in a thin box-shaped cassette; said cassette being provided with a first and a second side parts parallel to each other, at least one window disposed near said first side part to expose a portion of the medium, a cover movable along said first side part to close and open said window, and at least two positioning holes first one of which is disposed near said first side part; and the cassette being insertable into the apparatus along a predetermined first direction parallel to said side parts;

said apparatus comprising:

(a) a first cassette holder for receiving and holding the cassette, said holder being arranged to receive the cassette from said first direction and movable in a predetermined second direction substantially perpendicular to said first direction to place the cassette at a predetermined loading position;

(b) a second cassette holder for holding the cassette simultaneous with said first holder, said second holder being separated from the first holder and disposed behind the first holder along said first direction, said second holder being movable in said first and said second directions;

(c) moving means for moving said first and said second holders, said moving means being arranged to firstly move the second holder in said first direction and thereafter move the second holder, which has moved in said first direction, and the first holder in said second direction;

(d) positioning pins respectively engageable with the positioning holes of the cassette to position the cassette at said loading position;

(e) opening means for moving said cover of the cassette to open the window when the cassette is inserted into said apparatus along said first direction;

(f) a head for recording signals on and/or reproducing recorded signals from the medium, said head being arranged to confront a recording surface of the medium through the opened window of the cassette when the cassette is placed at said loading position; and (g) rotating means for rotating the medium relative to said head, said rotating means being engageable with a portion of the medium when the cassette is placed at said loading position.

15. The apparatus according to claim 14, wherein said opening means is provided on said first holder.

16. The apparatus according to claim 14, further comprising:

pull-in means for pulling the cassette into said apparatus in said first direction, said pull-in means having an engaging member engageable with said first one of the positioning holes of the cassette and pulling the cassette at said first positioning hole thereof through said engaging member.

17. The apparatus according to claim 16, wherein said pull-in means is provided on said second holder.

18. The apparatus according to claim 14, wherein said record bearing medium has a center core to engage with said rotating means; and the apparatus further comprises:

pressing means for pressing the center core of the medium to engage the center core with the rotating means.

19. The apparatus according to claim 18, wherein said pressing means is disposed between said first and said second holders.

20. The apparatus according to claim 14, wherein said record bearing medium is flexible; said cassette has a pair of windows opposed to each other; said head is arranged to confront the medium through a first one of the windows; and the apparatus further comprises:

stabilizing means for stabilizing the medium relative to said head when the medium is rotated by said rotating means, said stabilizing means being arranged to confront a surface of the medium through a second one of the windows of the cassette.

21. The apparatus according to claim 20, wherein said stabilizing means is disposed between said first and said second holders.

22. A recording and/or reproducing apparatus using a disc-shaped flexible record bearing medium having a center core and housed in a cassette, said cassette having at least one window to expose a portion of the medium, said apparatus comprising:
   (a) a first cassette holder for receiving and holding the cassette, said first holder being arranged to receive the cassette from a predetermined first direction and movable in a predetermined second direction which is perpendicular to said first direction to place the cassette at a predetermined loading position;
   (b) a second cassette holder for holding the cassette simultaneous with said first holder, said second holder being separated from the first holder and disposed behind the first holder along said first direction, said second holder being movable in said first and said second directions;
   (c) moving means for moving said first and said second holders, said moving means being arranged to firstly move the second holder in said first direction and thereafter move the second holder, which has moved in said first direction, and the first holder in said second direction;
   (d) a head for recording signals on and/or reproducing recorded signals from the medium, said head being arranged to confront a recording surface of the medium through the window of the cassette when the cassette is place at said loading position;
   (e) rotating means for rotating the medium relative to said head, said rotating means being engageable with the center core of the medium when the cassette is placed at said loading position; and
   (f) pressing means for pressing the center core of the medium to engage the center core with said rotating means, said pressing means being disposed between said first and said second holders.

23. The apparatus according to claim 22, wherein said cassette has a pair of windows opposed to each other; said head is arranged to confront the medium through a first one of the windows; and the apparatus further comprises:
   stabilizing means for stabilizing the medium relative to said head when the medium is rotated by said rotating means, said stabilizing means being disposed between said first and said second holders and arranged to confront a surface of the medium through a second one of the windows of the cassette.

24. The apparatus according to claim 22, further comprising:
   pull-in means for pulling the cassette into said apparatus, said pull-in means being provided on said second holder and pulling the cassette, accordingly, as the second holder is moved along said first direction.

25. The apparatus according to claim 22, wherein said cassette has a shutter for closing the window, said shutter being movable along said first direction relative to the cassette when the cassette is inserted into said first holder; and the apparatus further comprises:
   operation means for moving the shutter relative to the cassette to open the window when the cassette is inserted into the said apparatus, said operation means being provided on the first holder.

26. A recording and/or reproducing apparatus using a disc-shaped flexible record bearing medium having a center core and housed in a cassette, said cassette having a pair of windows opposed to each other to expose a portion of the medium, said apparatus comprising:
   (a) a first cassette holder for receiving and holding the cassette, said first holder being arranged to receive the cassette from a predetermined first direction and movable in a predetermined second direction which is perpendicular to said first direction to place the cassette at a predetermined loading position;
   (b) a second cassette holder for holding the cassette simultaneous with said first holder, said second holder being separated from the first holder and disposed behind the first holder along said first direction, said second holder being movable in said first and said second directions;
   (c) moving means for moving said first and said second holders, said moving means being arranged to firstly move the second holder in said first direction and thereafter move the second holder, which has moved in said first direction, and the first holder in said second direction;
   (d) a head for recording signals on and/or reproducing recorded signals from the medium, said head being arranged to confront a recording surface of the medium through a first one of the window of the cassette when the cassette is placed at said loading position;
   (e) rotating means for rotating the medium relative to said head, said rotating means being engageable with the center core of the medium when the cassette is placed at said loading position; and
   (f) stabilizing means for stablizing the medium relative to said head when the medium is rotated by said rotating means, said stabilizing means being disposed between said first and said second holders and arranged to confront a surface of the medium through a second one of the windows of the cassette.

27. The apparatus according to claim 26, further comprising:
   pull-in means for pulling the cassette into said apparatus, said pull-in means being provided on said second holder and pulling the cassette, accordingly, as the second holder is moved along said first direction.

28. The apparatus according to claim 26, wherein said cassette has a shutter for closing the windows, said shutter being movable along said first direction relative to the cassette when the cassette is inserted into said apparatus; and the apparatus further comprises:
   operation means for moving the shutter relative to the cassette to open the window when the cassette is inserted into said apparatus, said operation means being provided on the first holder.

29. A recording and/or reproducing apparatus using a record bearing medium housed in a housing, said housing being provided with at least one window to expose a portion of the medium, and the housing being insertable into the apparatus along a predetermined first direction, said apparatus comprising:

(a) first holder means for receiving and holding the housing, said first holder means being arranged to receive the housing from said first direction and movable in a predetermined second direction, which is different from said first direction, to place the housing at a predetermined loading position;

(b) second holder means for holding the housing with said first holder means, said second holder means being movably disposed relative to said first holder means in said first direction, said second holder means being movable between a first position where said second holder means is moved relatively to said first holder means to come close to said first holder means and a second position where said second holder means is moved to be separated from said first holder means in said first direction, said second holder means being movable also in said second direction; and (c) recording and/or reproducing means for recording signals on and/or reproducing recorded signals from the medium, said recording and/or reproducing means being disposed between said first and said second holder means and arranged to confront one surface of the medium through a first one of the windows of the housing; and (d) stabilizing means for stabilizing the medium relative to said recording and/or reproducing means, said stabilizing means being disposed between said first and said second holder means and arranged to confront another surface of the medium through a second one of the windows of the housing.

30. The apparatus according to claim 29, wherein said stabilizing means is arranged to come into contact with said another surface of the medium through said second one of the windows of the housing when the housing is placed at said loading position.

31. The apparatus according to claim 29, wherein said record bearing medium is disc-shaped, said housing being provided with at least one hole to expose a center portion of said medium; and the apparatus further comprises:

rotating means for rotating said medium relative to said recording and/or reproducing means, said rotating means being engageable with said center portion of said medium when the housing is placed at said loading position.

32. The apparatus according to claim 31, wherein said stabilizing means is arranged to come into noncontact with said another surface of the medium through said second one of the windows of the housing when the housing is placed at said loading position and said medium is rotated by said rotating means.

33. The apparatus according to claim 29, wherein said housing includes a cassette.

34. A recording and/or reproducing apparatus using a record bearing medium housing in a housing, said housing being provided with at least one window to expose a portion of the medium, and the housing being insertable into the apparatus along a predetermined first direction, said apparatus comprising:

a first holder means for receiving and holding the housing, said first holder means being arranged to receive the housing from said first direction and movable in a predetermined second direction which is different from said first direction to place the housing at a predetermined loading position;

(b) second holder means for holding the housing with said first holder means, said second holder means movably disposed relative to said first holder means in said first direction, said second holder means being movable between a first position where said second holder means is moved relatively to said first holder means to come close to said first holder means and a second position where said second holder means is moved to be separated from said first holder means in said first direction, said second holder means being movable also in said second direction; and (c) stamper means for stamping the medium, said stamper means including a stamping member for stamping a portion of the medium through the window of the housing, said stamper means being located between said first holder means and said second holder means when said housing is positioned at said loading position.

* * * * *